United States Patent
Meza et al.

(10) Patent No.: US 11,772,595 B2
(45) Date of Patent: Oct. 3, 2023

(54) AIRBAG WITH REINFORCED TETHER

(71) Applicant: ZF Passive Safety Systems US Inc., Washington, DC (US)

(72) Inventors: David Arturo Meza, Chih (MX); Jose Ramon Felix, Chih (MX)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 88 days.

(21) Appl. No.: 17/365,605

(22) Filed: Jul. 1, 2021

(65) Prior Publication Data

US 2023/0001880 A1   Jan. 5, 2023

(51) Int. Cl.
*B60R 21/2338* (2011.01)
*B60R 21/205* (2011.01)
*B60R 21/00* (2006.01)

(52) U.S. Cl.
CPC ........ *B60R 21/2338* (2013.01); *B60R 21/205* (2013.01); *B60R 2021/0004* (2013.01); *B60R 2021/23382* (2013.01)

(58) Field of Classification Search
CPC .............. B60R 21/2338; B60R 21/205; B60R 2021/0004; B60R 2021/23382
See application file for complete search history.

(56) References Cited

U.S. PATENT DOCUMENTS

| | | | | |
|---|---|---|---|---|
| 5,362,101 A * | 11/1994 | Sugiura | ............... | B60R 21/2338 280/743.2 |
| 7,192,053 B2 * | 3/2007 | Thomas | ............... | B60R 21/2338 280/739 |
| 7,393,011 B2 * | 7/2008 | Keshavaraj | ........... | B60R 21/206 280/739 |
| 7,621,561 B2 * | 11/2009 | Thomas | ................ | B60R 21/233 280/743.2 |
| 7,954,850 B2 * | 6/2011 | Fischer | ................. | B60R 21/239 280/739 |
| 8,196,957 B2 * | 6/2012 | Kubo | .................. | B60R 21/2338 280/743.2 |
| 8,262,130 B2 * | 9/2012 | Fischer | ............... | B60R 21/2338 280/739 |
| 8,371,612 B2 * | 2/2013 | Williams | ............ | B60R 21/2338 280/743.2 |
| 8,727,378 B2 * | 5/2014 | Hiruta | ................... | B60R 21/239 280/739 |
| 11,479,204 B1 * | 10/2022 | Moran | .................. | B60R 21/216 |
| 2016/0031405 A1 * | 2/2016 | Garcia | ............... | B60R 21/2338 280/743.2 |

* cited by examiner

*Primary Examiner* — Jason D Shanske
*Assistant Examiner* — Joselynn Y Sliteris
(74) *Attorney, Agent, or Firm* — TAROLLI, SUNDHEIM, COVELL & TUMMINO L.L.P.

(57) ABSTRACT

An apparatus for helping to protect an occupant of a seat in a vehicle having an instrument panel and a housing positioned therein includes an airbag for positioning in the housing and defining an inflatable volume for receiving inflation fluid from an inflator. The airbag includes an occupant-facing panel. A tether extends along a centerline and has a first end connected to a portion of the airbag positioned within the housing and a second end connected to the occupant-facing panel for forming a pocket therein. The second end includes a folded-over portion. Stitching extends through the folded-over portion in a direction extending transverse to the centerline.

14 Claims, 7 Drawing Sheets

FIG. 3

AIRBAG WITH REINFORCED TETHER

TECHNICAL FIELD

The present invention relates generally to vehicle airbags and, in particular, relates to an airbag having a reinforced face tether.

BACKGROUND

It is known to inflate an airbag to help protect a vehicle occupant in the event of a frontal impact to a vehicle. The airbag is commonly stored in a deflated condition, together with an inflator, in a vehicle instrument panel. In the event of a frontal impact to the vehicle of a magnitude above a predetermined threshold, the inflator is actuated and the airbag is inflated into a position between the vehicle occupant and the instrument panel. The airbag can help protect the vehicle occupant from forcefully striking or being struck by parts of the vehicle such as the instrument panel.

SUMMARY

In one example, an apparatus for helping to protect an occupant of a seat in a vehicle having an instrument panel and a housing positioned therein includes an airbag for positioning in the housing and defining an inflatable volume for receiving inflation fluid from an inflator. The airbag includes an occupant-facing panel. A tether extends along a centerline and has a first end connected to a portion of the airbag positioned within the housing and a second end connected to the occupant-facing panel for forming a pocket therein. The second end includes a folded-over portion. Stitching extends through the folded-over portion in a direction extending transverse to the centerline.

In another example, an apparatus for helping to protect an occupant of a seat in a vehicle having an instrument panel and a housing positioned therein includes an airbag for positioning in the housing and defining an inflatable volume for receiving inflation fluid from an inflator. The airbag includes an occupant-facing panel. A tether extends along a centerline and has a first end connected to a portion of the airbag positioned within the housing and a second end connected to the occupant-facing panel for forming a pocket therein. The second end includes a folded-over portion and having a width that increases in a direction extending from the first end to the second end. Openings extend through the folded-over portion and are aligned with longitudinal edge portions of the tether. Stitching extends through the folded-over portion in a direction extending transverse to the centerline.

Other objects and advantages and a fuller understanding of the invention will be had from the following detailed description and the accompanying drawings.

DETAILED DESCRIPTION

Figure 1:
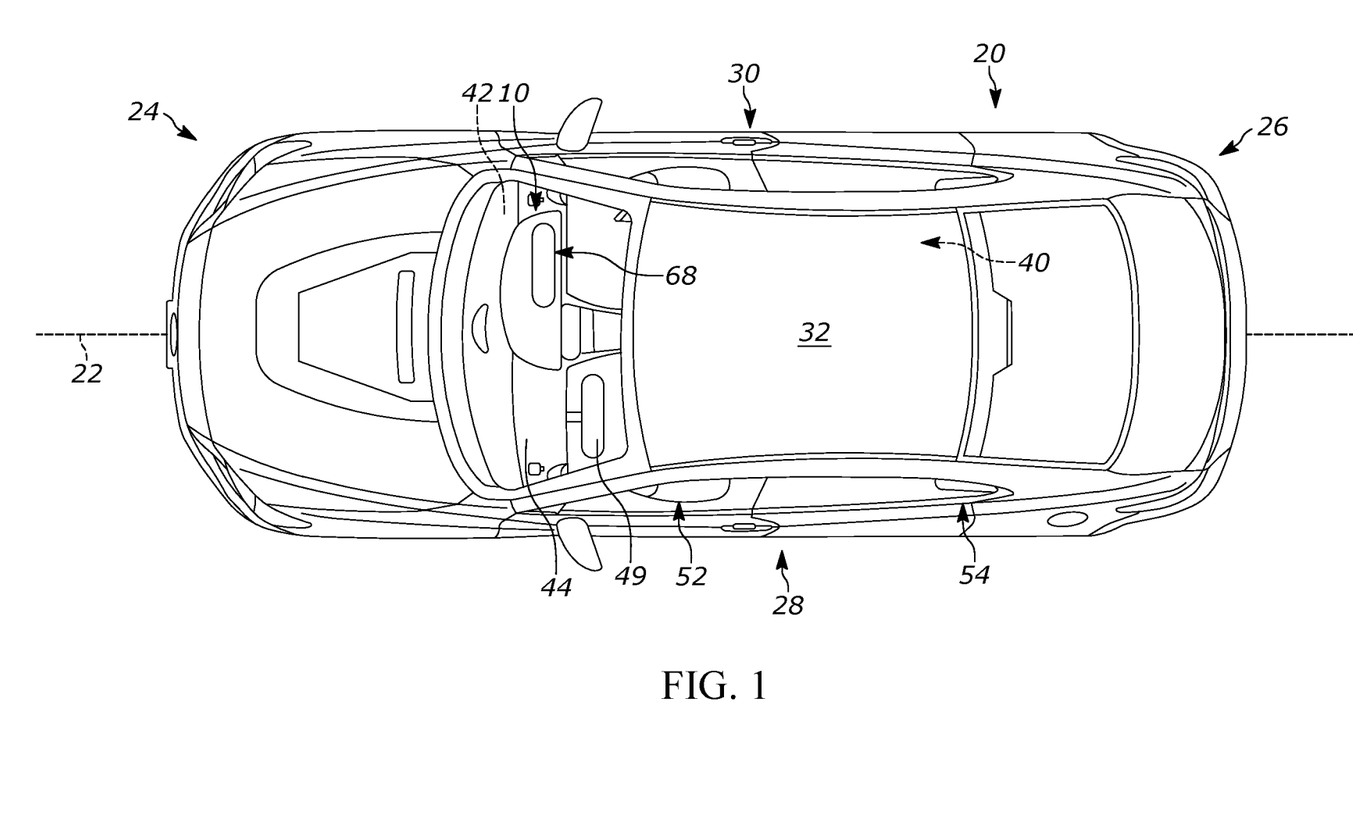
FIG. 1 is a top view of a vehicle including an example occupant restraint system.
Figure 2A:
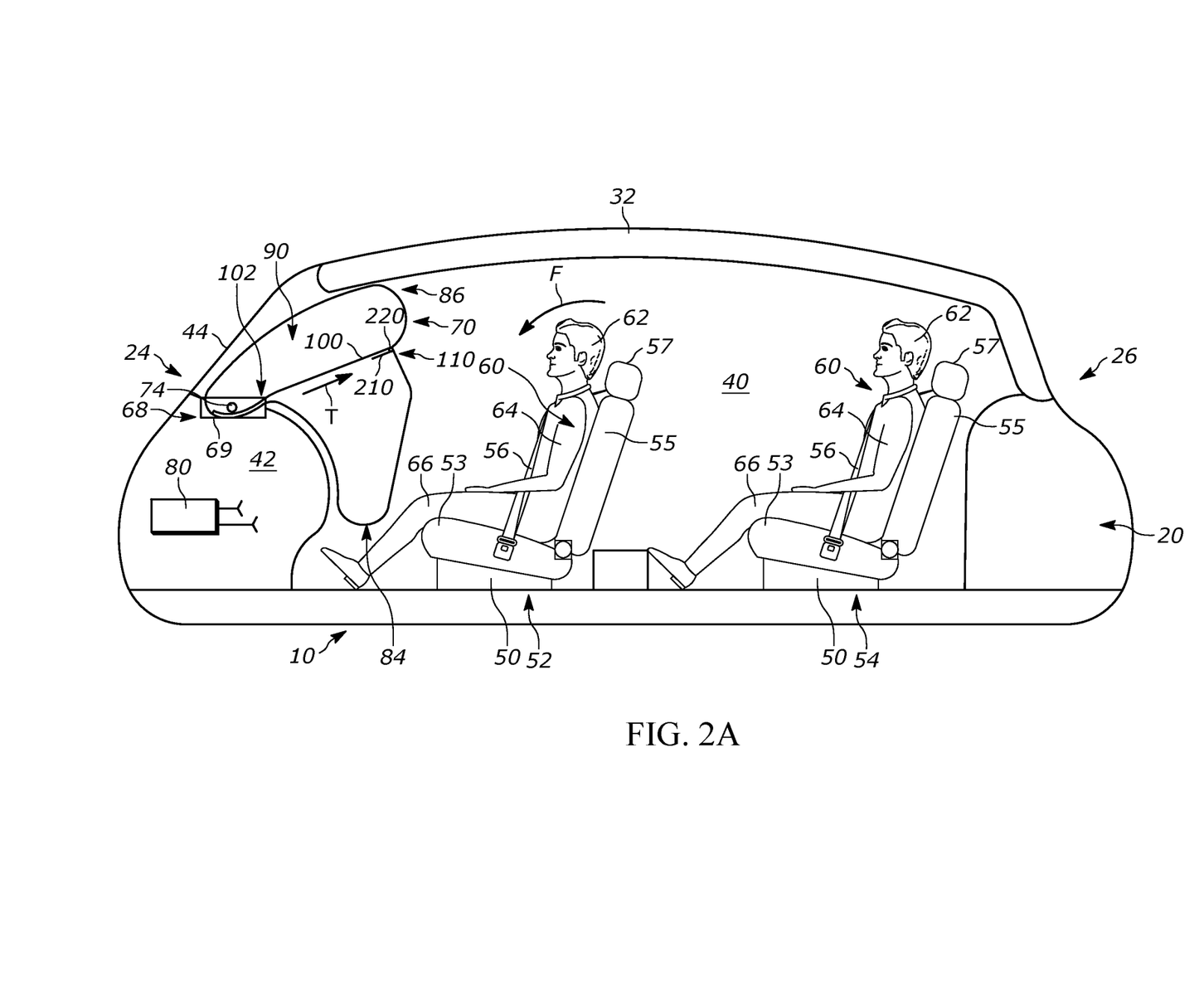
FIG. 2A is a schematic illustration of a cabin of the vehicle with an example seating arrangement and an example airbag of the restraint system in a deployed condition.
Figure 2B:
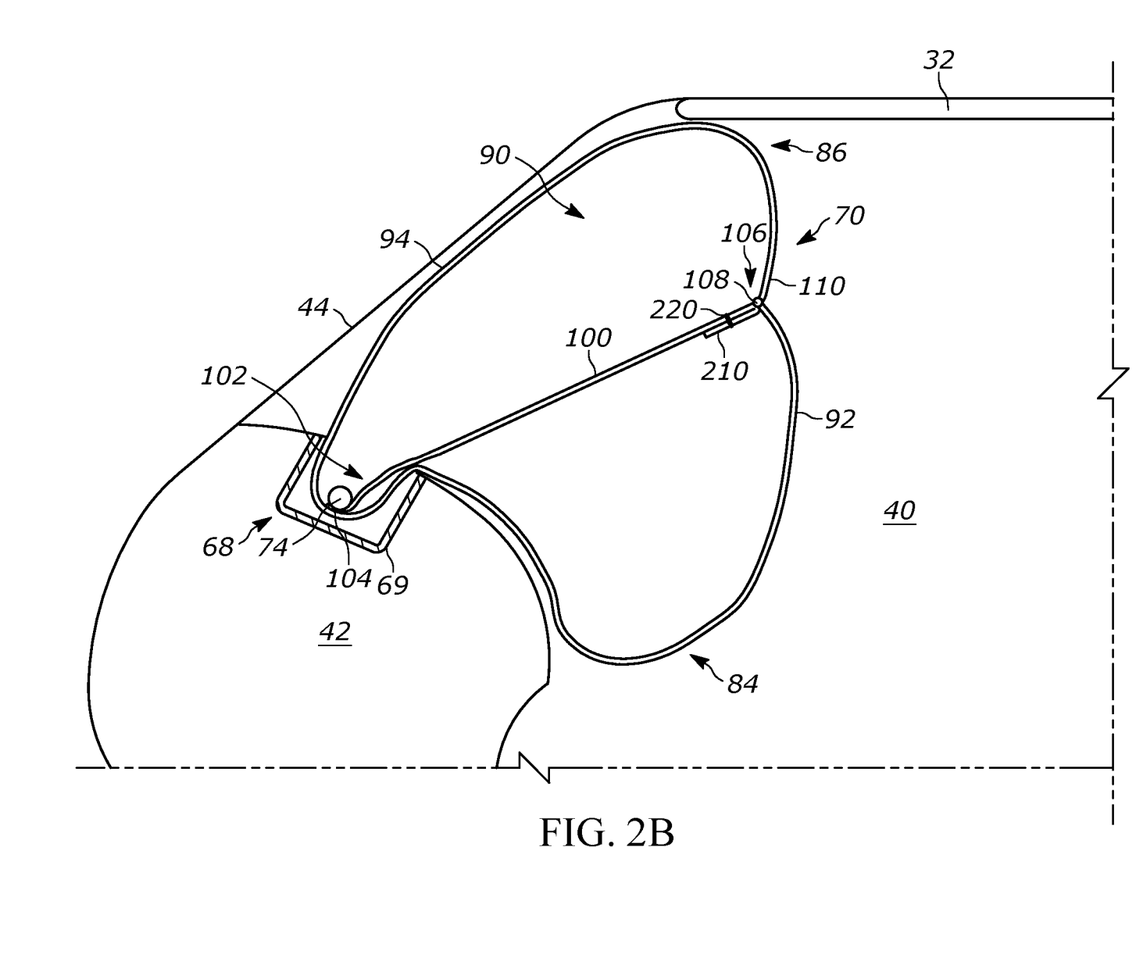
FIG. 2B is an enlarged view of a portion of FIG. 2A.

The present invention relates generally to vehicle airbags and, in particular, relates to an airbag having a reinforced face tether. FIGS. 1-2B illustrate an example vehicle safety system in the form of an occupant restraint system 10 for a vehicle 20. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 is located between the instrument panel 42 and the roof 32. A steering wheel 49 is connected to the instrument panel 42 on the left side 28 of the vehicle 20.

Seats 50 are positioned in the cabin 40 and can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The occupant restraint system 10 includes at least one vehicle occupant protection device in the form of an inflatable airbag 70 housed/concealed in the instrument panel 42. Mounting the airbag 70 in the instrument panel 42 is convenient because the airbag can be positioned in a location with a desired proximity to the occupant 60 it is intended to help protect. This can help reduce the necessary inflatable volume of the airbag 70 and can also help provide a desired airbag deployment time without requiring an excessively high-volume inflator.

The airbag 70 is stored in a module 68 having a housing 69 made of a durable material, such as plastic or metal. In the example configuration shown, the airbag modules 68 are mounted in the instrument panel 42 forward of the passenger side 30 occupant 60. The airbag 70 inflates and deploys upwards in the cabin 40 and rearward of the instrument panel 42, i.e., towards the rear end 26 of the vehicle 12. Accordingly, the airbag 70 is a passenger side airbag.

The airbag 70 is at least one of rolled and folded before being placed in the housing 69 of the module 68. The module 68 is then placed within the instrument panel 42 on the passenger side 30 and covered with a door. Alternatively or additionally, the module 68 can be placed within the steering wheel 49 (not shown) or within the instrument panel 42 on the side 28 when the vehicle 20 is autonomous (not shown).

In any case, an inflator 74 is positioned in each module 68 for providing inflation fluid to each airbag 70. The inflator 74 is operatively connected (e.g., by wires) to an airbag controller 80 (see FIG. 2) that includes or communicates with one or more crash sensors (not shown). The airbag controller 80 is operative to determine the occurrence of a crash event and to actuate the inflator(s) 74 in a known manner to inflate the airbag(s) 70. The inflator 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

As shown in FIGS. 2A-2B, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and instrument panel 42 to open (e.g., via tear seam or door). This releases the airbag 70 to inflate and deploy from its stored condition behind the instrument panel 42 to a deployed condition extending into the cabin 40 forward of and aligned with the passenger side 30 seat 50 in the front row 52. The airbag 70, while inflated, helps protect the vehicle occupant 60 in the front row 52 by absorbing the impact of the occupant.

The airbag 70, when deployed, extends from a lower end 84 to an upper end 86 and defines an inflatable volume 90. A first or front panel 92 faces rearward towards the occupant 60. A second or rear panel 94 faces forward towards the windshield 44. The airbag 70 can include one or more vents (not shown) for venting inflation fluid from the inflatable volume 90 in a known manner in response to occupant penetration.

In its deployed condition, the lower end 84 is configured to cover at least a portion of the occupant's knees and the upper portion of the legs 66. The upper end 86 is configured to extend vertically to a position sufficient to receive and help protect the occupant's head 62 and upper torso 64. The extent of the airbag 70 deployment vertically and/or horizontally (as shown in FIGS. 2A-2B) can be adjusted in order to adjust the coverage of the airbags. To this end, the airbag 70 can be configured to extend further fore and/or aft in order to help protect the occupant 60 in the event of a side, oblique or offset collision. The inflated width of the airbag 70 in the inboard-outboard direction can also be adjusted.

A tether 100 is secured to the interior of the airbag 70 for forming a depression or pocket 110 in the occupant-facing panel 92 configured to receive the occupant 60 during a vehicle crash. The pocket 110 can provide a volume of reduced tension in the airbag 70 fabric along the occupant-facing panel 92, which provides a relatively softer impact/reduced impact forces between the occupant and the occupant-facing panel 92. To this end, the tether 100 extends from a first end 102 connected to the airbag 70 at a first location indicated at 104 within the housing 69 to a second end 106 connected to the airbag 70 at a second location indicated at 108. In one example, the second location 108 is positioned on the interior side of the occupant-facing panel 92.

Because the occupant 60 is belted, a frontal crash resulting in forward occupant 60 movement causes the occupant to move in a path toward the airbag 70, as indicated generally by the arrow F in FIG. 2A. That said, the connection between the airbag 70 and the instrument panel 42, in combination with the engagement between the deployed airbag and instrument panel/windshield 44, act to limit or restrict forward movement of the airbag away from the occupant 60 in response to occupant penetration. In other words, the instrument panel 42 and windshield 44 can help prevent or limit airbag 70 movement in the direction F.

The inflation rate, deployment trajectory, and shape of the airbag 70 can be configured to optimize the protection of occupants 60 having a wide range of sizes and/or seating positions. To this end, the airbag 70 can optionally be used in combination with additional tethers and/or have multiple chambers to achieve appropriate or desired deployment characteristics suitable for the vehicle interior and/or seating position of the occupants 60. These features can be configured to help protect occupants 60 that are slouched, reclined, etc.

With this in mind, FIGS. 3-5B illustrate example components and manufacturing steps for assembling the airbag 70. To this end, the airbag 70 includes a series of panels interconnected to define the ends 84, 86, the inflatable volume 90 for receiving inflation fluid from the inflator 74, and the tether 100. A weave direction of each panel 120, 140, 160, 180, 190 is indicated at W.

Figure 3:
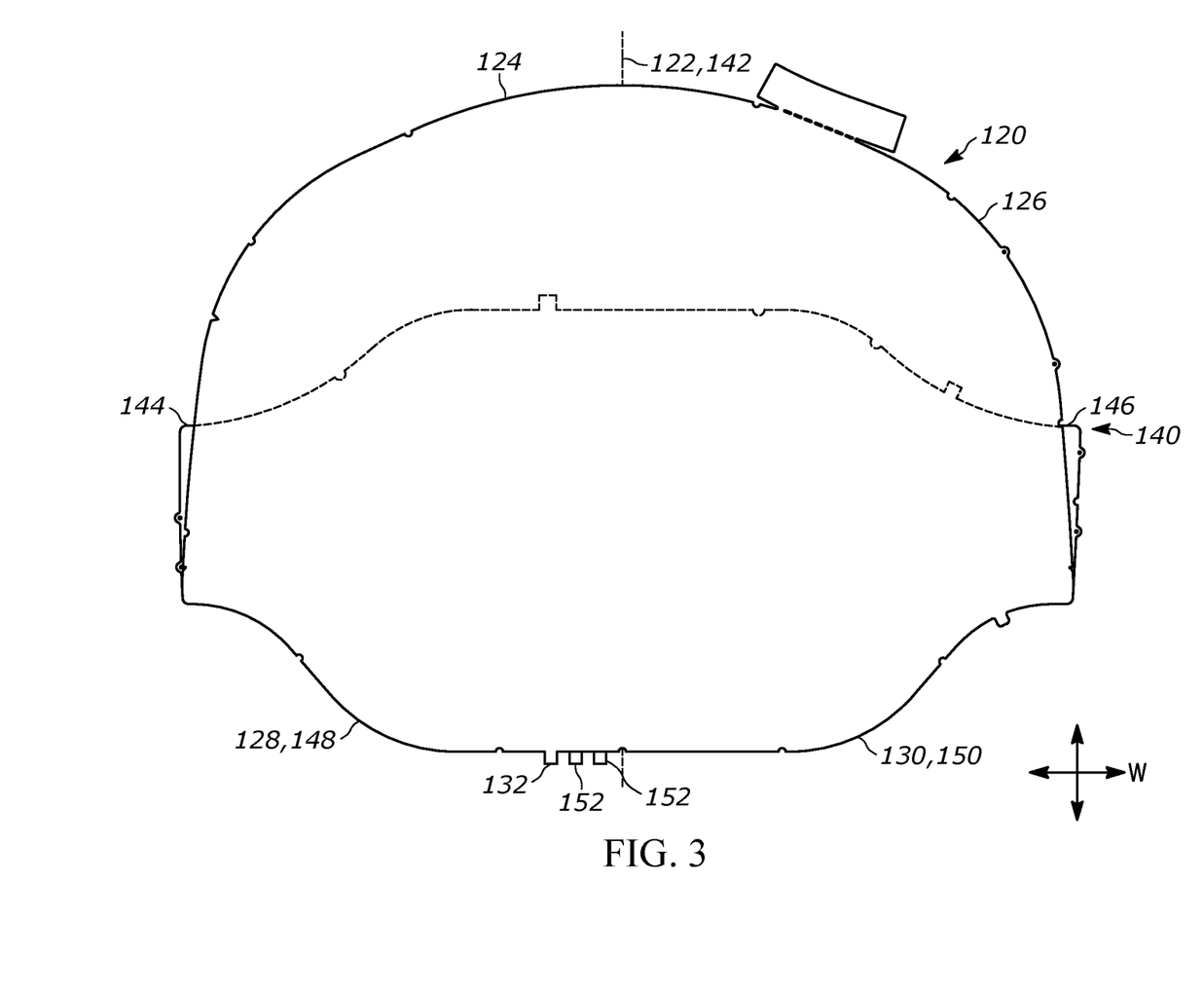
FIG. 3 is a top view of first and second panels of the airbag.

Two of the panels used to form the airbag 70 are illustrated at 120 and 140 in FIG. 3. More specifically, the first and second panels 120, 140 help to form the occupant-facing panel 92. As shown, the panels 120 overlays the panel 140. The first panel 120 is symmetric about a centerline 122 and includes peripheral edge portions 124, 126, 128, 130 that cooperate to define the entire perimeter of the first panel. One or more tabs 132 extends from the peripheral edge portion 128.

The second panel 140 is symmetric about a centerline 142 and includes peripheral edge portions 144, 146, 148, 150 that cooperate to define the entire perimeter of the second panel. One or more tabs 152 extends from the peripheral edge portion 148. The first panel 120 overlays the second panel 140 such that the centerlines 122, 142 are aligned and the peripheral edge portions 128, 130 and 148, 150, respectively, are aligned. In this manner, the tabs 132, 152 are aligned with one another.

Figure 4A:
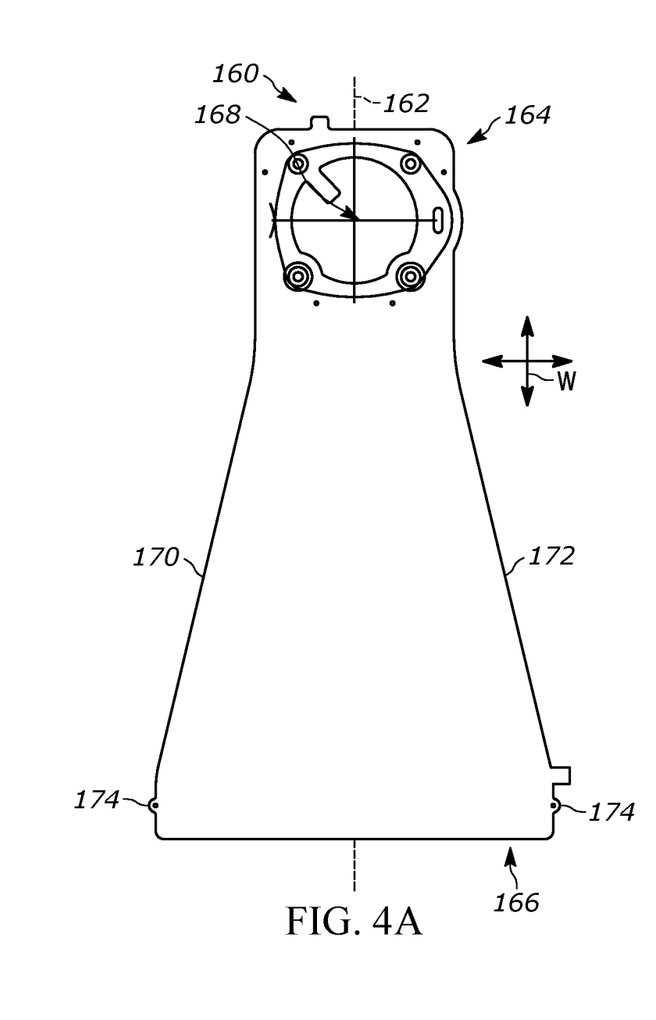
FIG. 4A is a top view of a first panel used to form a tether for the airbag.
Figure 4B:
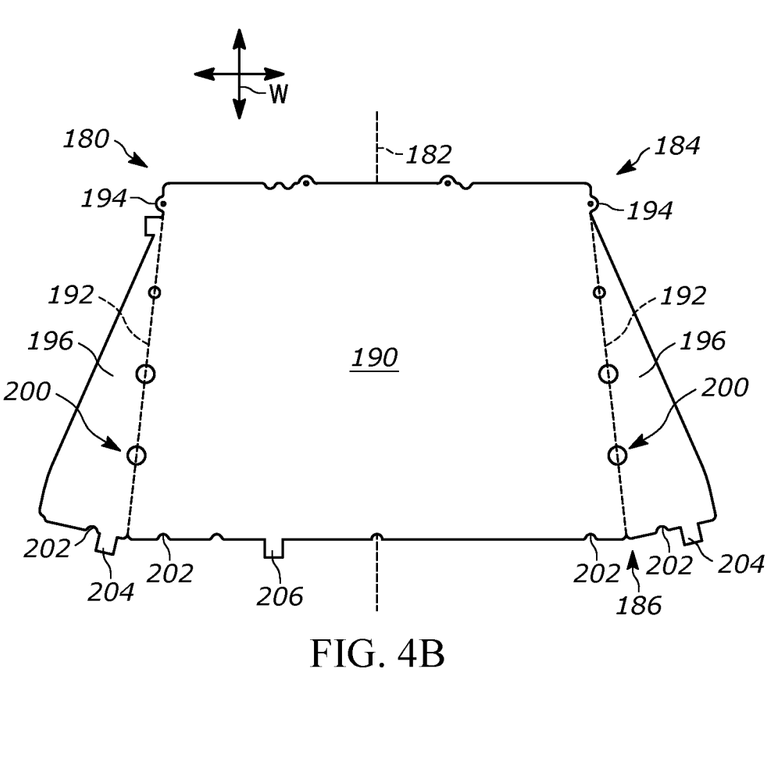
FIG. 4B is a top view of another panel used to form the tether.

Panels 160, 180 for forming the tether 100 are illustrated in FIGS. 4A-4B. In FIG. 4A, the panel 160 extends longitudinally along a centerline 162 from a first end 164 to a second end 166. An opening 168 for receiving the inflator 74 is provided in the first end 164. Peripheral edge portions 170, 172 extend on opposite sides of the centerline 162 from the first end 164 to the second end 166. In one example, the peripheral edge portions 170, 172 diverge away from one another such that the panel 160 becomes wider in a direction extending towards the second end 166. In other words, the panel 160 is tapered. The taper can extend only along portion(s) of the length of the panel 160 (as shown) or can be continuous along the entire length of the panel 160 (not shown). Alternatively, the peripheral edge portions 170, 172 can extend parallel to one another such that the width of the panel 210 is substantially constant (not shown).

A series of alignment features 174, e.g., tabs, is provided at the second end 166. In the example shown, tabs 174 are provided along the respective peripheral edge portions 170, 172 so as to be symmetrically arranged about the centerline 162. In other words, each of the tabs 174 has the same longitudinal position along the respective peripheral edge portion 170, 172 relative to the centerline 162.

In FIG. 4B, the panel 180 extends longitudinally along a centerline 182 from a first end 184 to a second end 186. The panel 180 includes a base 190 centered on the centerline 182. A pair of second centerlines 192 is positioned on opposite sides of the centerline 182. The second centerlines 192 can extend at an angle relative to one another (as shown) or extend parallel to one another (not shown). In this example, the second centerlines 192 are spaced apart and angled relative to one another in the same manner as the longitudinal edge portions 170, 172 are with one another.

A series of alignment features 194, e.g., tabs, is provided at the first end 184. In the example shown, tabs 194 are provided on the base 190 so as to be symmetrically arranged about the centerline 182.

Projections 196 extend outwardly from the base 190 on opposite sides of the centerline 182. As shown, the projections 196 are triangular and widen in a direction extending towards the second end 186. In one example, the projections 196 extend along and outward from second centerlines 192. Consequently, the projections 196 diverge from one another in a direction extending towards the second end 186.

One or more openings 200 are provided along each second centerline 192 such that the openings are symmetrical about the centerline 182. The openings 200 can have any shape, e.g., circular, elliptical, round, triangular, polygonal, etc. The openings 200 along each second centerline 192 can have the same size as one another or different sizes. As shown, the openings 200 are circular and increase in diameter in a direction extending towards the second end 186.

Alignment features 202, e.g., notches, are provided on each projection 196 and the base 190. Tabs 204 extend downward (as shown) from the projections 196. A tab 206 extends downward (as shown) from the base 190.

Figure 4C:
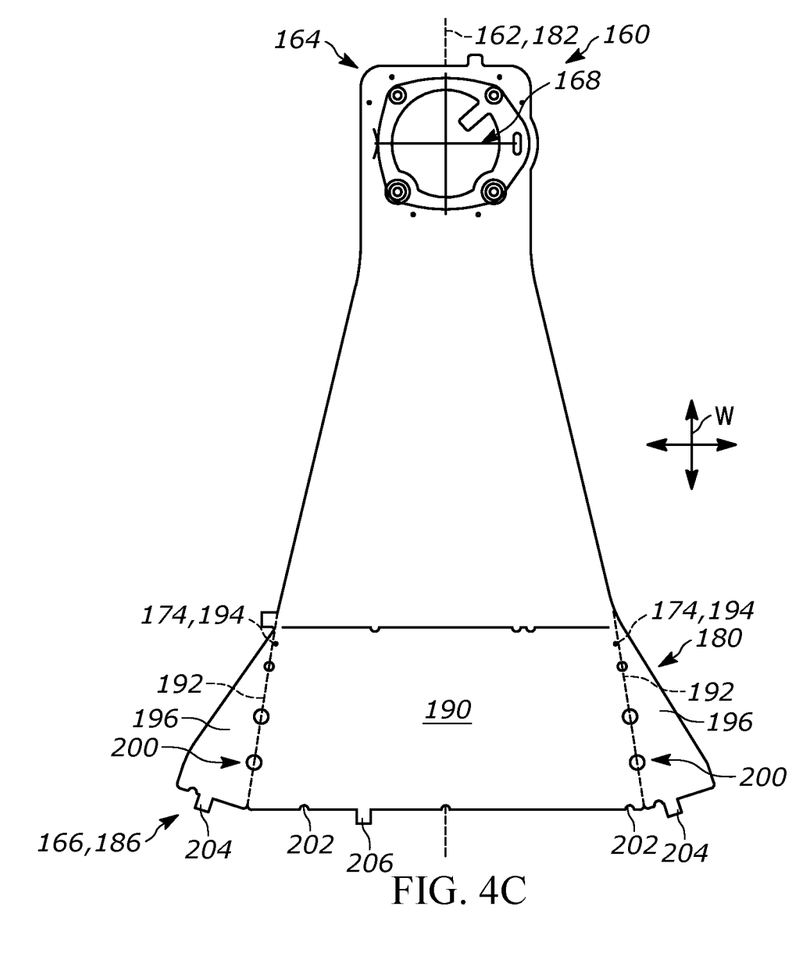
FIG. 4C is a top view of the assembled tether.

Referring to FIG. 4C, the panel 180 is positioned atop the panel 160 such that the alignment features 174, 194 are aligned with one another. In this orientation, the second centerlines 192 are aligned or substantially aligned with the respective longitudinal edge portions 170, 172 and, thus, the openings 200 are aligned with the longitudinal edge portions. In this state, the projections 196 therefore extend outward or laterally relative to the longitudinal edge portions 170, 172 and the centerline 162. The panels 160, 180, however, are not secured to one another at this time.

Figures 5A, 5B:
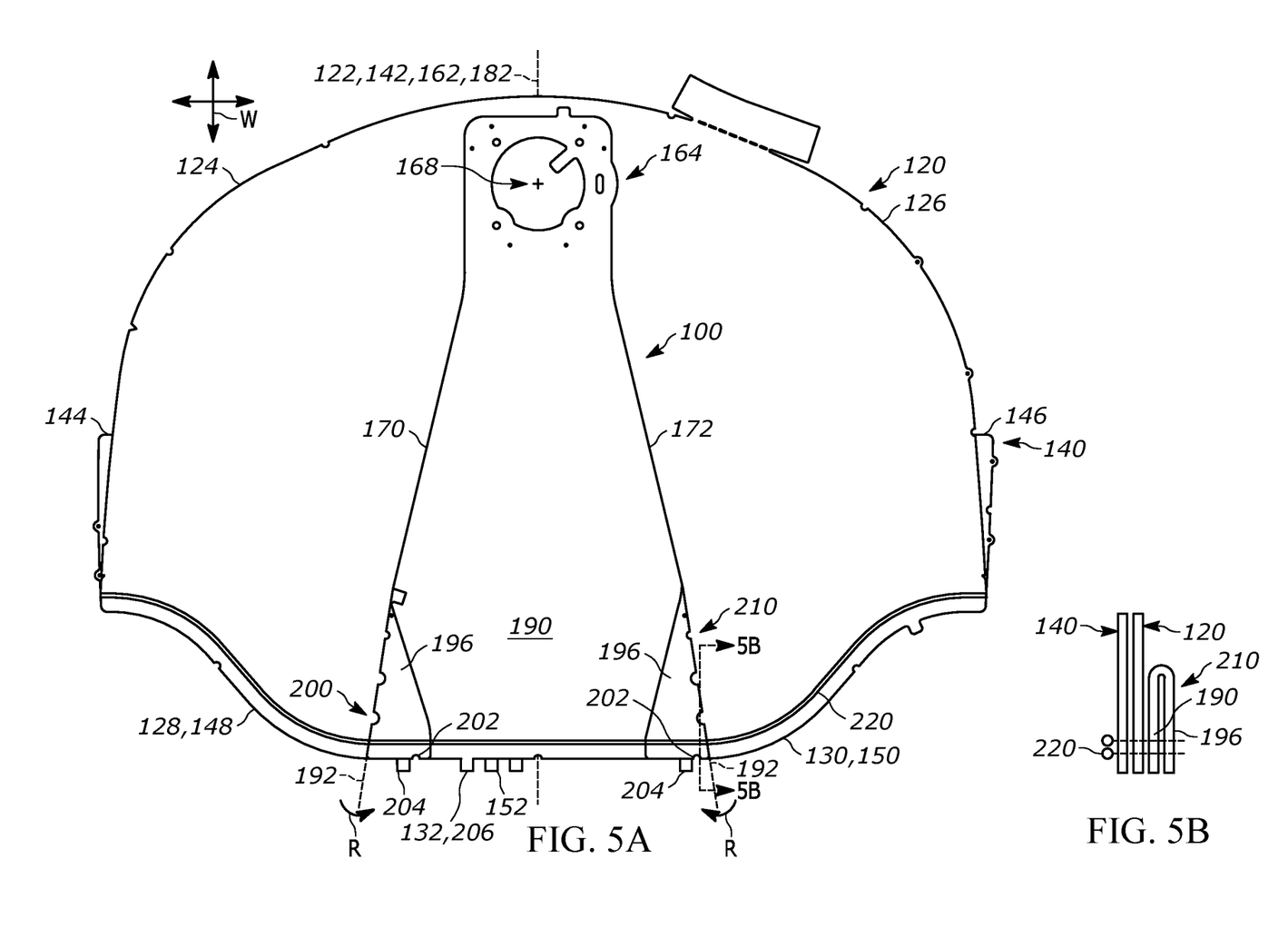
FIG. 5A is a top view of the tether secured to the panels of FIG. 3 to form a subassembly.
FIG. 5B is a section view of the subassembly of FIG. 5A.

Rather, the overlaid panels 160, 180 are positioned over the overlaid panels 120, 140 such that the centerlines 122, 142, 162, 182 are coextensive and the tabs 132, 206 are aligned with one another. The projections 196 are then folded inwards over the respective second centerlines 192 and towards the centerlines 122, 142, 162, 182 in the manner indicated generally at R. Since the second centerlines 192 are aligned with the longitudinal edge portions 170, 172 the projections 196 are also folded inwards about and relative to the longitudinal edge portions.

Folding the projections 196 aligns the tabs 204 on the projections with the already aligned tabs 132, 152, 206 and forms a folded-over portion or portions 210 in the tether 100. In other words, the pair of inwardly/laterally folded projections 196 cooperate to define the folded-over portion 210. It will be appreciated that the projections 196 can be folded to sit atop the panel 180 or folded so as to be positioned between the panel 140 and the first panel 120.

Stitching 220 extends along and through the aligned longitudinal edge portions 128, 148 of the panels 120, 140, the folded-over portions 210 and second end 186 of the panel 180, and the aligned longitudinal edge portions 130, 150 of the panels 120, 140 to form an airbag subassembly. The portion of the stitching 220 extending through the tether 100 extends transverse, e.g., perpendicular, to the centerlines 162, 182 of the panels 160, 180.

That said, the same stitching 220 interconnects not only the panels 120, 140 with one another but also the panels 160, 180 with one another and all the panels 120, 140, 160, 180 together in a single step/pass. In other words, no separate sewing or securing step is needed to secure the projections 196 to the second end 166 of the panel 160. One or both ends of the stitching 220 can include backtack (not shown) to prevent loosening of the stitching. It will be appreciated that one or more additional panels of material are secured to the subassembly 230 in order to form the remainder of the airbag 70, including the ends 84, 86 and rear panel 94.

Returning to FIGS. 2A-2B, in the installed state, the first end 102 of the tether 100 extends into the housing 69 and connects to the inflator 74. In particular, the inflator 74 is received by—or placed in fluid communication with—the opening 168 in the panel 160. When a vehicle crash is detected, the controller 80 actuates the inflator 74 to inflate and deploy the airbag 70 in a known manner. Since the second end 106 of the tether 100 is secured to the occupant-facing panel 92, the second end moves in the rearward direction of the vehicle 20 with the occupant-facing panel 92 relative to the fixed first end 104.

The deploying airbag 70 tensions the tether in the manner generally indicated at T in FIG. 2A until the airbag becomes fully deployed, in which case the tether is taught (see also FIG. 2B). Due to the geometry of the airbag 70, the instrument panel 42, and/or the positioning of the housing 69 therein, tension T on the tether 100 can produce undue stress therein.

With this in mind, the tether 100 is advantageously configured to mitigate the aforementioned stresses and help increase the performance and reliability of the tether. In particular, forming the folded-over portion 210 via the stitching 220 reinforces the tether 100 and helps to prevent tearing thereof during airbag deployment. To this end, as noted, the stitching 220 extends transverse to the tether 100 centerline. Due to the orientation of the tether 100 within the airbag 70, this results in the stitching 220 extending transverse, e.g., perpendicular, to the direction of tension T on the tether. This helps to maximize the resistance of the stitching 220 to tearing/coming undone when tensioned.

Furthermore, the tapered shape of the panel 160, as well as the openings 200 in the folded-over portion 210, helps to better distribute tensile forces acting on the tether 100. In particular, these features help the tether 100 to experience reduced stitch force, reduced edge tearing force, and a more evenly spread force distribution across the panel fabric during deployment of the airbag. More specifically, during tensioning of the tether 100, the fabric of the tether stretches such that the openings 200 elongate. This elongation helps to damped/alleviate stress on the fabric. This advantageously helps to prevent tearing of the tether and/or stitching during airbag deployment.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for helping to protect an occupant of a seat in a vehicle having an instrument panel and a housing positioned therein, comprising:
an airbag for positioning in the housing and defining an inflatable volume for receiving inflation fluid from an inflator, the airbag including an occupant-facing panel;
a tether extending along a centerline and having a first end connected to a portion of the airbag positioned within the housing and a second end connected to the occupant-facing panel for forming a pocket therein, the second end including folded-over portions; and
stitching extending through the folded-over portions in a direction extending transverse to the centerline, wherein the second end of the tether includes projections positioned on opposite sides of the centerline, the projections being folded towards the centerline to define the folded-over portions, wherein the projections are folded over opposing longitudinal edge portions of the tether, and wherein openings extend through the folded-over portions and are aligned with the opposing longitudinal edge portions.

2. The apparatus recited in claim 1, wherein the stitching extends perpendicular to the centerline.

3. The apparatus recited in claim 1, wherein the tether has a width that increases in a direction extending from the first end to the second end.

4. The apparatus recited in claim 1, wherein the projections are triangular.

5. The apparatus recited in claim 1, wherein the openings are round.

6. The apparatus recited in claim 1, wherein the openings increase in size in a direction extending towards the second end.

7. An apparatus for helping to protect an occupant of a seat in a vehicle having an instrument panel and a housing positioned therein, comprising:
an airbag for positioning in the housing and defining an inflatable volume for receiving inflation fluid from an inflator, the airbag including an occupant-facing panel;
a tether extending along a centerline and having a first end connected to a portion of the airbag positioned within the housing and a second end connected to the occupant-facing panel for forming a pocket therein, the second end including folded-over portions, and the tether having a width that increases in a direction extending from the first end to the second end, wherein openings extend through the folded-over portions and are aligned with opposing longitudinal edge portions of the tether; and
stitching extending through the folded-over portions in a direction extending transverse to the centerline.

8. The apparatus recited in claim 7, wherein the stitching extends perpendicular to the centerline.

9. The apparatus recited in claim 7, wherein the second end of the tether includes projections positioned on opposite sides of the centerline, the projections being folded towards the centerline to define the folded-over portions.

10. The apparatus recited in claim 9, wherein the projections are triangular.

11. The apparatus recited in claim 9, wherein the projections are folded over the opposing longitudinal edge portions of the tether.

12. The apparatus recited in claim 7, wherein the openings are round.

13. The apparatus recited in claim 7, wherein the openings increase in size in a direction extending towards the second end.

14. The apparatus recited in claim 7, wherein the folded-over portions are folded inwards towards the centerline.

* * * * *